United States Patent Office 3,170,858
Patented Feb. 23, 1965

3,170,858
PROCESS FOR MAKING TETRAFLUORO-
ETHYLENE POLYMERS
Paul E. Muehlberg, Lake Jackson, Gaines C. Jeffrey, Freeport, and Lester W. Harriman, Angleton, Tex., assignors to The Dow Chemical Company, Midland, Mich., a corporation of Delaware
No Drawing. Filed July 20, 1962, Ser. No. 211,423
5 Claims. (Cl. 204—154)

This invention concerns a process for preparing tetrafluoroethylene polymers suitable for making fluid-permeable filters and pertains to fluid-permeable microporous filters made from such polymers.

It is known to prepare fluid-permeable filters from fluoroethylene polymers by pressing or compacting a layer of a polymer such as polytetrafluoroethylene or polychlorotrifluoroethylene to form a sheet which is then brought to a sintering temperature by heating in an oven. U.S. Patent No. 2,819,209 makes fluid-permeable filters by sintering a layer of particles of polytetrafluoroethylene or polychlorotrifluoroethylene while confining the layer under a pressure of from 30–50 p.s.i. at a temperature above the softening point and below the melting and decomposition temperatures of the particles.

It has now been discovered that fluid-permeable filters can readily be prepared from tetrafluoroethylene polymers which have been prepared by polymerizing monomeric tetrafluoroethylene in contact with particles of a finely divided solid tetrafluoroethylene polymer that has previously been subjected to the action of high energy ionizing radiation in a reduced atmosphere not exceeding 100 millimeters, and preferably at about 100 microns or less, of Hg, absolute pressure, with an effective dose to initiate polymerization of the monomeric tetrafluoroethylene, continuing the polymerization until an amount of the monomer corresponding to at least 50 percent by weight of the starting polymer is polymerized, then irradiating the resulting polymer with high energy ionizing radiations in a reduced atmosphere not exceeding 100 millimeters, preferably not greater than 100 microns of Hg absolute pressure, with an effective dose to initiate polymerization of monomeric tetrafluoroethylene, and thereafter continuing the polymerization of monomer until the amount of total polymer corresponds to at least about an equal weight of the initial irradiated polymer starting material. The cycle of operations is preferably repeated for a plurality of times such that the weight of the final product is several times the weight of the initial polymer starting material.

It has further been found that tetrafluoroethylene polymers prepared by procedure as just described, whether they be polymers consisting wholly of polytetrafluoroethylene, i.e., tetrafluoroethylene polymerized by contacting the same with irradiated polytetrafluoroethylene, or consisting of a predominant amount of polymerized tetrafluoroethylene such as is obtained by contacting monomeric tetrafluoroethylene with an irradiated copolymer of a major proportion by weight of tetrafluoroethylene and a minor proportion of another ethylenically unsaturated fluoro compound copolymerizable therewith, e.g., vinylidene fluoride or hexafluoropropene, have a characteristic hard sand-like or grainy feel which is distinctly different from the soft fibrous or greasy hand of the usual polytetrafluoroethylene polymer and that layers of the sand-like polymer particles can readily be compressed into any desired shape such as sheet, tubes, cups, and the like, and sintered by heating at temperatures between about 360° and 390° C. under pressure, or at atmospheric pressure, to form a network of united particles having good mechanical properties, uniform distribution of pores and good permeability to fluids, i.e., gases and/or liquids.

The tetrafluoroethylene polymer starting material can be polytetrafluoroethylene or a copolymer of a predominant amount by weight of tetrafluoroethylene and a minor amount of another monoethylenically unsaturated fluorine containing monomer copolymerizable therewith such as vinylidene fluoride, monochlorotrifluoroethylene, hexafluoropropene and the like. The starting polymer is employed in the form of fine particles of sizes not substantially larger than 50 mesh per inch as determined by U.S. Standard screens, preferably particles of sizes not greater than 100 mesh per inch, and may be used in any desired amount.

It is important in preparing polymers, in accordance with the invention, suitable for making fluid-permeable filters, that the tetrafluoroethylene which is polymerized while in contact with the irradiated polymer starting material be in an amount that is at least equal to 50 percent by weight of the starting polymer and that the final polymer product be that obtained by the carrying out of at least two cycles of irradiation in a reduced atmosphere, followed by contacting of the irradiated polymer with monomeric tetrafluoroethylene and polymerization of the monomer in an amount at least equal to 50 percent by weight of the starting polymer, so that the final product consists of at least 50 percent by weight of polymerized tetrafluoroethylene formed by contact of the monomer with irradiated polymer. Best results are usually obtained by carrying out the process for a plurality of from 4 to 10 cycles of irradiating the polymer in a reduced atmosphere, contacting the irradiated polymer with monomeric tetrafluoroethylene, and polymerizing an amount of the monomer equal to at least 50 percent by weight of the starting polymer, preferably about an equal weight or more, so that the final product is from 2 to 10 or more times as great as the initial starting polymer material.

The tetrafluoroethylene polymers thus prepared can be ground or crushed to particles of a desired size, e.g., to particles of sizes between about 20 and 150 mesh per inch as determined by U.S. Standard screens. Filters of the polymers are prepared by pressing a layer of the tetrafluoroethylene polymer particles in a mold having inert non-adhering surfaces of any desired configuration and then sintering the layer by heating it at the temperatures between about 360° and 390° C. Such sintering can be carried out by heating the pressed layer in the mold while under slight pressure, e.g., a pressure of from about 5 to 50 pounds per square inch gauge pressure, or by removing the pressed layer from the mold and heating it at a sintering temperature in an oven, after which the sintered filtered is cooled or is allowed to cool to room temperature or thereabout.

The layer of the tetrafluoroethylene particles can be of any thickness depending upon the desired thickness of the filler. Filters of any desired pore size and thickness can be prepared by an appropriate selection of particle size and thickness of the layer to be pressed. It may be mentioned that the pore size and tensile strength of the finished filter vary with the pressure employed in pre-forming or pressing the tetrafluoroethylene polymer particles. In general, an increase in the preforming pressure results in a final product having greater tensile strength, while the pore size of the finished filter becomes smaller the greater the preforming pressure employed. Preforming pressures of from about 25 to 5000 pounds per square inch or more can be used at room temperature or thereabout.

The following examples illustrate ways in which the principle of the invention has been applied, but are not to be construed as limiting the invention.

EXAMPLE 1

A charge of 10 grams of powdered polytetrafluoroethylene was placed in a 4 liter capacity glass vessel. The vessel was evacuated to about 5 microns of Hg absolute pressure, then was filled with gaseous tetrafluoroethylene monomer and was re-evacuated to 5 microns of Hg absolute pressure. The vessel was placed adjacent to a 500-curie cobalt-60 source and the polymer therein subjected to the action of gamma rays in a field of an intensity of 0.05 megarad for a period one hour. The radiation source was removed. The reaction vessel was filled with gaseous monomeric tetrafluoroethylene to 10 pounds per square inch gauge pressure. Flow of monomeric tetrafluoroethylene into the vessel was maintained at 10 pounds per square inch gauge pressure. After the rate of polymerization had decreased to a value corresponding to a flow rate of about 2 ml./min. of monomer, the reaction vessel was re-evacuated to about 5 microns of Hg absolute pressure, the polymer therein was re-irradiated to activate the same, the vessel was then filled with gaseous tetrafluoroethylene to 10 pounds per square inch gauge pressure, and the cycle of polymerization of the monomer repeated. In the experiment the polymer in the reaction vessel was subjected to six such cycles of evacuation, irradiation and monomer polymerization. It was observed that the volume of polymer in the reaction vessel increased during each polymerization period. At the end of the sixth polymerization period, there was recovered 1685 grams of product as a friable particulate material. It was pulverized and found to have a "sandy" or "granular" feel, distinctly different from the "fibrous" or "greasy" feel of the polytetrafluoroethylene starting material. The product was polytetrafluoroethylene by analysis. A portion of the product was formed into a sheet about 1/16 inch thick by pressing a 3000 pounds per square inch gauge pressure, and was sintered by heating the pressed sheet in an oven at a temperature of 380° C. for a period of 40 minutes, then was cooled to room temperature. The sintered sheet was porous and permeable to the flow of fluids, e.g., air. A summary of the experiment is reported in Table 1 below. The table identifies the cycle, gives the amount of polymer in the reaction vessel at the start of the cycle, and the irradiation does in megarads to which the polymer was subjected before polymerization of monomer was continued.

Table 1

| Cycle No. | Polymer in Reaction Vessel, gms. | Irradiation Dose, Megarads |
|---|---|---|
| 0 | 10 | 0.055 |
| 1 | 19.5 | 0.047 |
| 2 | 68 | 0.0155 |
| 3 | 234 | 0.0062 |
| 4 | 736 | 0.0029 |
| 5 | 1,230 | 0.001 |
| 6 | 1,685 | |

EXAMPLE 2

The experiment of Example 1 was repeated in a manner similar to that described therein for five cycles of evacuating, irradiating, and polymerizing of monomer, for a period of 24 hours, then on the sixth cycle the polymerization was allowed to continue for a period of 8 days. A summary of the experiment is reported in Table 2.

Table 2

| Cycle No. | Polymer in Reaction Vessel, gms. | Irradiation Dose, Megarads |
|---|---|---|
| 0 | 10 | 0.055 |
| 1 | 33.7 | 0.045 |
| 2 | 152 | 0.0173 |
| 3 | 480 | 0.0033 |
| 4 | 757 | 0.0041 |
| 5 | 962 | 0.0041 |
| 6 | 3,212 | |

The polymer product was obtained as a friable cake. It was ground to a particulate form in a Waring blender. The granular polymer had a sand-like grainy feel or hand. Sheets prepared by pressing and sintering the pressed sheet at 380° C. were found to be permeable to fluids.

The polytetrafluoroethylene prepared in the foregoing examples was found to be suitable for making porous sheets by pressing, then sintering the pressed sheet by heating at a temperature of 380° C. for a period of 40 minutes. The porosity or pore size of the sheet is controlled in part by the pressure employed to press the powder or granular material into a sheet.

EXAMPLE 3

In each of a series of experiments, a portion of the combined batches of polytetrafluoroethylene prepared in Examples 1 and 2 above was pressed into a sheet 1/16 inch thick under a pressure as stated in the following table, then was sintered by heating the sheet at a temperature of 380° C. for a period of 40 minutes. The sintered sheet was tested to determine its tensile strength, its yield strength and the percent elongation. Other pressed and sintered test sheets were tested to determine the rate of flow of air and of water therethrough under a stated pressure differential, and to determine the diameter of the pores in the sintered sheet. Table III identifies the experiments and gives the pressure in pounds per square inch gauge pressure employed to press the granular polytetrafluoroethylene into a sheet, after which it was sintered by heating to a temperature of 380° C. for a period of 40 minutes. The sintered sheet was tested to determine its tensile strength, its yield strength and the percent elongation. Other pressed and sintered test sheets were tested to determine the rate of flow of air and of water therethrough under a stated pressure differential, and to determine the diameter of the pores in the sintered sheet. Table III identifies the experiments and gives the pressure in pounds per square inch gauge pressure employed to press the granular polytetrafluoroethylene into a sheet, after which it was sintered by heating to a temperature of 380° C. for a period of 40 minutes. The table also gives the mechanical properties determined for the sintered sheet, the rate of flow of air at room temperature through the sheet at several pressures, the rate of flow of water at room temperature through the sheet at several pressures, and the size of the pores in the sintered sheet.

Table III

| Run No. | Pre-Form pressure, p.s.i. | Tensile Strength, lbs./sq. in. | Yield Strength, lbs./sq. in. | Elongation, Percent | Flow of Air cu. ft./min./sq. ft. at $\Delta P$, p.s.i. | | | Flow of Water, gal./min./sq. ft. at $\Delta P$, p.s.i. | | | Pore Size, Microns |
|---|---|---|---|---|---|---|---|---|---|---|---|
| | | | | | $\Delta P=2$ | $\Delta P=4$ | $\Delta P=8$ | $\Delta P=2$ | $\Delta P=4$ | $\Delta P=8$ | |
| 1 | 30 | 724 | 474 | 53 | 78 | 136 | 220 | 1.8 | 7.4 | 28.5 | 15 |
| 2 | 50 | 1,304 | 686 | 109 | 52 | 100 | 184 | 0.6 | 2.3 | 17.0 | 19.5 |
| 3 | 100 | 1,750 | 943 | 167 | 36.4 | 64.5 | 153 | 1.2 | 4.2 | 12.1 | 19.2 |
| 4 | 1,000 | 1,818 | 838 | 100 | 5.5 | 9.1 | 24.2 | 0.2 | 0.4 | 0.85 | 7.25 |
| 5 | 5,000 | 2,187 | 1,456 | 114 | 0.96 | 2.56 | 3.6 | 0 | 0.005 | 0.17 | 5.35 |

We claim:
1. A process for making a tetrafluoroethylene homopolymer suitable for making fluid-permeable filters by pressing and sintering at elevated temperatures and pressures, which process comprises polymerizing tetrafluoroethylene by contacting monomeric tetrafluoroethylene with particles of a finely divided tetrafluoroethylene homopolymer, which homopolymer particles have previously been subjected to the action of high energy ionizing radiation in a reduced atmosphere not greater than 100 millimeters of Hg absolute pressure, with an effective dose to initiate polymerization of the monomeric tetrafluoroethylene, and graft copolymerizing an amount of tetrafluoroethylene equal to at least 50 percent by weight of the irradiated polymer, then again irradiating the graft copolymer in a reduced atmosphere not greater than 100 millimeters of Hg absolute pressure with an effective dose of high energy ionizing radiation to initiate polymerization of monomeric tetrafluoroethylene, again contacting the irradiated graft copolymer with monomeric tetrafluoroethylene and copolymerizing thereon an amount of tetrafluoroethylene equal to at least 50 percent by weight of the irradiated graft copolymer, and repeating the cycle of operations for a plurality of times.

2. A process as claimed in claim 1, wherein the polymerization of the tetrafluoroethylene is carried out at temperatures between 0° and 75° C.

3. A process as claimed in claim 1, wherein the high energy ionizing radiation is gamma rays.

4. A process as claimed in claim 1, wherein the high energy ionizing radiation is high speed electrons.

5. Polytetrafluoroethylene prepared by the process of claim 1.

References Cited in the file of this patent
UNITED STATES PATENTS

| | | |
|---|---|---|
| 2,396,629 | Alfthan | Mar. 19, 1946 |
| 2,400,091 | Alfthan | May 14, 1946 |
| 2,819,209 | Pall et al. | Jan. 7, 1958 |
| 2,956,899 | Cline | Oct. 18, 1960 |
| 2,983,657 | Gabilly et al. | May 9, 1961 |